May 14, 1963 G. H. A. HINDER 3,089,175
WINDSHIELD WIPERS
Filed Sept. 1, 1960 2 Sheets-Sheet 1
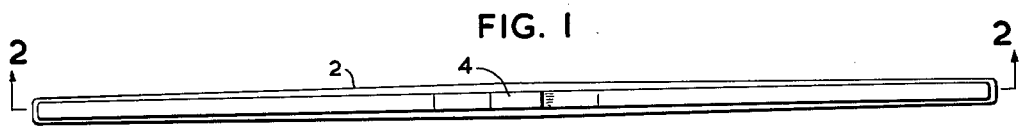
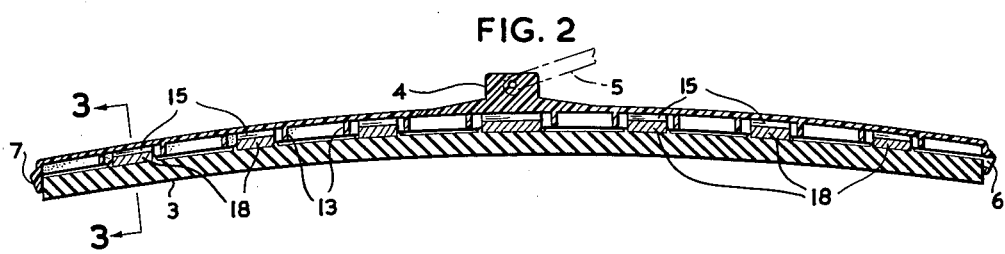
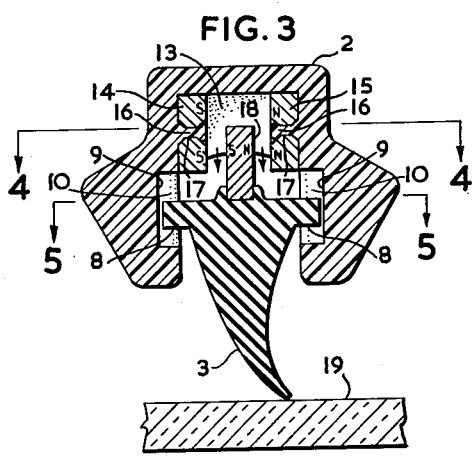
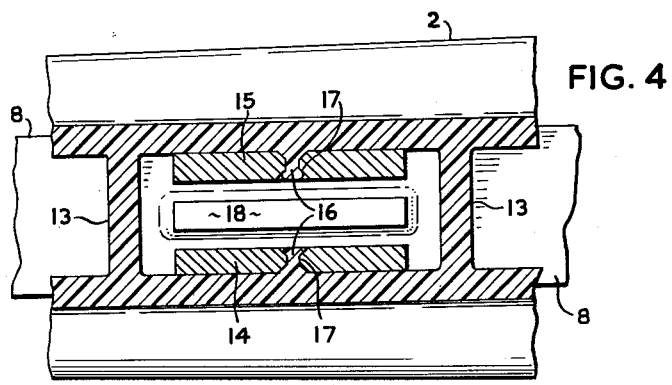
INVENTOR
GORDON H.A. HINDER
BY Fetherstonhaugh & Co
ATTORNEYS

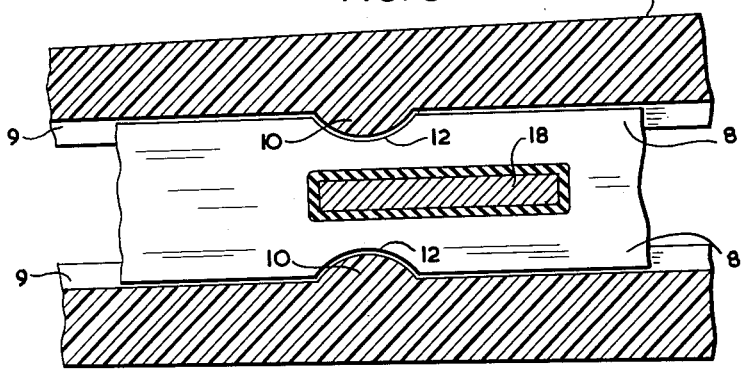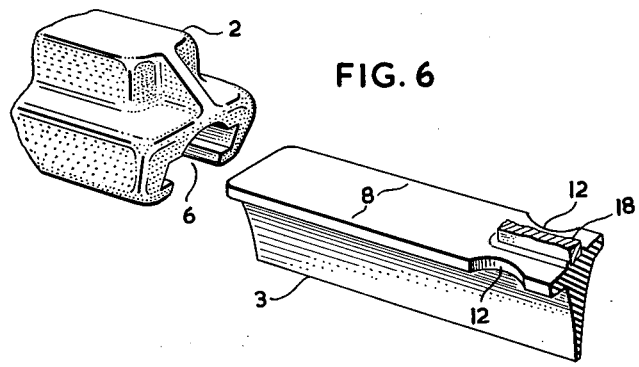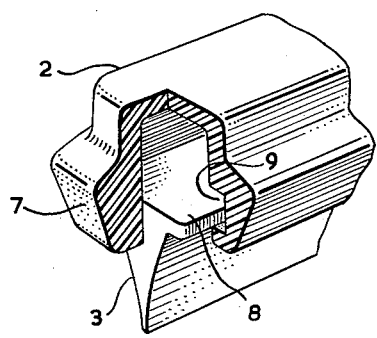

United States Patent Office 3,089,175
Patented May 14, 1963

3,089,175
WINDSHIELD WIPERS
Gordon H. A. Hinder, Hamilton, Ontario, Canada, assignor to Hamilton Clamp & Stampings Limited, Hamilton, Ontario, Canada
Filed Sept. 1, 1960, Ser. No. 53,501
8 Claims. (Cl. 15—250.36)

This invention relates to improvements in windshield cleaners or wiper devices and is particularly directed to wiper blade assemblies for cleaning curved glass surfaces, such as automobile windshields In an endeavour to meet the difficulties presented in providing a wiper blade assembly which will flex in swinging to-and-fro across a curved windshield surface many types of metal linkage arrangements for supporting the standard squeegee wiping element have been devised and patented, and wherein the link members are pivoted to the squeegee element in spaced relationship along its length to permit flexing movement of the squeegee in its wiping swing; the wiper blade assembly being carried upon the outer end of a conventional wiper arm which presses the wiper blade assembly against the windshield.

While wiper blade assemblies of the foregoing type are, to quite an extent, standard equipment upon present day automobiles they are not completely satisfactory in that the linkage cannot evenly press the wiper blade assembly against the curved windshield surface for the reason that the linkage pressure is only exerted against the flexible wiper element at several spaced apart points and which results in streaking in light shower conditions or if the squeegee blade of the element becomes even slightly worn. Furthermore, in winter conditions, ice and snow clog the linkage with the result that the linkage loses its freedom of movement and the wiper element ceases to flex. In an endeavour to overcome this deficiency a special winter wiper blade assembly is obtainable wherein the linkage is encased in a rubber jacket.

The object of this invention is to provide a wiper blade assembly wherein the squeegee wiping element supporting linkage is completely eliminated and magnetic means provided for exerting a balanced even pressure of the squeegee wiping member against a windshield.

A further object of the invention is to provide a flexible squeezee wiping member which readily conforms to the changing curvature in to-and-fro movement across a curved windshield and to furnish a plurality of magnets, preferably of the permanent type, positioned in spaced relationship along the length of the wiper blade assembly and in the magnetic fields of which the squeegee element is urged in the direction of the surface being wiped.

Another object of the invention is to provide an arrangement of sets of magnets whereby maximum depth of effective magnetic force is obtained, such arrangement consisting of two sets of magnets so mounted upon one member that each magnet of one set is opposite to and spaced apart from a magnet in the other set, a third set of magnets being carried upon the other member and wherein each magnet is positioned to register with the space between two magnets of the other two sets, each two opposite magnets in the two sets repelling a magnet in the third set.

A still further object of the invention is to provide a windshield cleaner consisting of a moulded plastic backing member having a windshield wiper arm attaching part and formed with a channel extending from end to end thereof and in which the squeegee wiping unit is freely contained, the unit normally floating in a magnetic field set up within the backing by the provision of suitably arranged magnetic elements.

With the foregoing and other objects in view, as shall appear, the invention consists of a wiper device formed and arranged all as hereinafter more particularly described and illustrated in the accompanying drawings, in which:

FIG. 1 is a front view of a curved moulded backing member within which the squeegee wiper member is mounted.

FIG. 2 is a longitudinal cross sectional view taken through the line 2—2, FIG. 1.

FIG. 3 is an enlarged transverse sectional view, taken through the line 3—3, FIG. 2, and showing the squeegee member pressing against a surface being wiped.

FIG. 4 is a fragmentary cross sectional view taken through the line 4—4, FIG. 3.

FIG. 5 is also a fragmentary cross sectional view taken through the line 5—5, FIG. 3.

FIG. 6 is an enlarged fragmentary perspective view of one end of the backing member together with a portion of the squeegee wiper member before its insertion into the backing member, and FIG. 7 is an enlarged broken away perspective view of the other end of the backing member and contained squeegee member.

The curved backing member 2 is preferably integrally formed of moulded resilient plastic material, such as thermoplastic nylon resin manufactured by Du Pont and sold under the trade name "Zytel," though the provision of a moulded or plastic backing member is not essential in carrying out the invention. The flexible squeegee wiping member 3 is formed of rubber-like material and follows standard practice.

The backing member 2 is preferably formed with a centrally positioned integral lug 4 and to which the usual spring urged windshield wiper arm 5 is attached. The backing member is also formed with a squeegee member containing channel 6 which opens inwardly from its concave face and extends from end to end thereof, the squeegee wiper member 3 being insertable into the channel at one end of the backing member 2, as shown in FIG. 6, and retained against excess inward movement by a lip 7 formed upon the other end of the member, as shown in FIG. 7.

The squeegee member 3 is formed with a pair of flanges 8 extending from either side thereof and which are received within a pair of grooves 9 of greater width than the thickness of the flanges and formed within the side walls of the channel to extend along its length in spaced relation to the outer edges of its side walls.

To retain the squeegee member 3 in position against excessive longitudinal movement within the backing member 2 a plurality of integral convex tongues 10 are formed within the grooves 9 and arranged to enter and loosely fit within correspondingly arranged recesses 12 in the edges of the squeegee member flanges 8. As both the backing member and squeegee member are moulded of resilient material the tongues 10, which in practice are relatively small, present no problem in insertion or withdrawal of the squeegee member.

For the purpose of retaining the wiper assembly against possible excessive lateral flexing or bending when encountering conditions, such as heavy snow, a plurality of lateral webs 13, bridging the groove 6 are moulded in the member, the webs also giving the backing member sufficient body to retain its curvature.

As the primary object of this invention is to utilize magnetic force for resiliently supporting the squeegee member and allowing it maximum flexing in its to-and-fro movement, a plurality of permanent magnets are provided and so arranged as to thrust the squeegee member in the direction of the surface to be wiped. As the standard wiper blade arm 5 is spring mounted to also thrust the wiper assembly towards the surface to be wiped, it will be apparent that the magnetic thrust of the squeegee member and the spring thrust of the arm can be so related that the squeegee member floats in relation to the backing member and is thus free to completely flex in adjusting to changing curvatures.

In the magnetic arrangement as shown in the drawings, three sets of magnets are used and wherein two sets of magnets 14 and 15 are positioned in spaced relationship along the side walls of the channel 6, the magnets of one set being positioned to have their north poles opposite to the south poles of the magnets of the other set. Any suitable magnet mounting means may be used, such as the domes 16 moulded upon the side walls of the channel 6 and snapped into orifices 17 in the magnets. The third set of magnets 18 are suitably secured to and mounted upon the inner face of the squeegee member 3 and arranged to register with the spaces between the magnets 14 and 15 and being so positioned that their north and south poles are opposite to the north and south poles of the magnets 14 and 15 and whereby the magnets 18 are repelled to thrust the squeegee member against the glass 19 being wiped, as shown in FIG. 3. As the grooves 9 are wider than the thickness of the flanges 8, the squeegee member has floating freedom to completely flex in adjusting to changing curvatures in its swinging movement.

While a particular arrangement of permanent magnets has been shown it is to be understood that this arrangement may be altered, and if desired electro magnets may be used, without departing from the spirit of the invention as set forth in the appended claims.

What I claim as my invention is:

1. A windshield wiper assembly for wiping a windshield as it moves along such windshield comprising a backing member; a blade member; means mounting the blade member loosely with respect to the backing member; and cooperating magnetic means on the members; the magnetic means of the blade member being in the field of the magnetic means of the backing member and so arranged with respect thereto that the magnetic means of the backing member repels that of the blade member to urge it and such blade member away from the backing member and against the windshield being wiped by the assembly as it moves along such windshield.

2. A windshield wiper assembly comprising a backing member, a blade member, means mounting the blade member loosely with respect to the backing member, and cooperating magnetic means on the members; said cooperating magnetic means being so arranged that the magnetic means of the backing member urges the magnetic means of the blade member in such a direction as to bias the blade member towards a windshield being wiped by it.

3. A construction according to claim 2 wherein the backing member is rigid and bowed and the blade member is flexible along its length to conform to the bowed backing member; the blade member being on the concave side of the backing member; and the convex side of the backing member has thereon means for connecting it to a windshield wiper arm whereby the assembly may be moved by said arm along a windshield to wipe it.

4. A construction according to claim 2 wherein the magnetic means includes two series of longitudinally spaced magnetic blocks, one on each of the backing members and blade member.

5. A construction according to claim 2 wherein the magnetic means includes two separate magnetic means on one member between which is a separate magnetic means of the other member.

6. A construction according to claim 2 wherein the magnetic means includes two separate magnetic means on one member between which is the magnetic means of the other member, and wherein each of the three separate magnetic means is a series of longitudinally spaced magnetic blocks.

7. A construction according to claim 2 wherein the backing member is of channel cross-section and the blade member is inside it; and the magnetic means comprises two separate magnetic means on the two sides of the backing member and one separate magnetic means on the blade member.

8. A construction according to claim 2 wherein the backing member is of channel cross-section and the blade member is inside it; and the magnetic means comprises two separate magnetic means on the two sides of the backing member and one separate magnetic means on the blade member; and wherein each of the three separate magnetic means is a series of longitudinally spaced magnetic blocks.

References Cited in the file of this patent

UNITED STATES PATENTS 2,537,411     Klingler _____ Jan. 9, 1951

FOREIGN PATENTS 707,559     Great Britain _____ Apr. 21, 1954

OTHER REFERENCES

Germany, printed application 1,032,441, June 19, 1958.